A. G. HECKROTTE.
Car Coupling.
No. 13,264. Patented July 17, 1855.
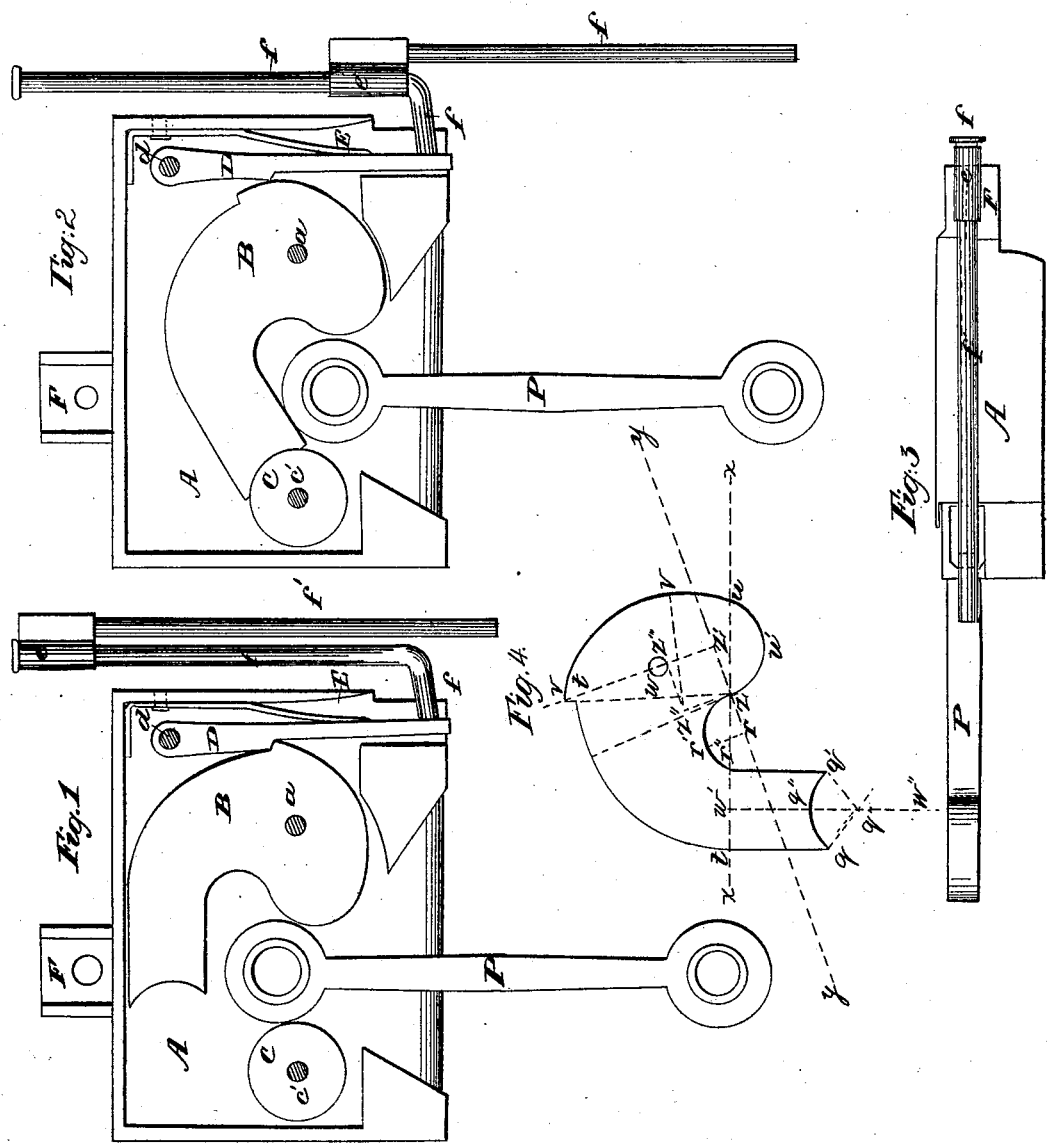

UNITED STATES PATENT OFFICE.

AARON G. HECKROTTE, OF NEW YORK, N. Y.

RAILROAD-CAR COUPLING.

Specification of Letters Patent No. 13,264, dated July 17, 1855.

*To all whom it may concern:*

Be it known that I, AARON G. HECKROTTE, of the city and State of New York, have invented a new and useful Improvement on W. C. Bussey's Patented Car-Coupling; and I do hereby declare that the following is a full, clear, and exact description of the construction and operation of the same, reference being had to the annexed drawing, forming part of this specification, in which—

Figure 1 is a top view of box containing the coupling apparatus, with the cover removed; showing bar connected. Fig. 2 is a similar view showing bar disconnected. Fig. 3 is a side view of apparatus in position shown in Fig. 1. Fig. 4 is a diagram showing the construction of the coupling scroll.

Similar letters refer to the same parts in all the figures.

The invention here considered as an improvement on Bussey's patent of July 17th, 1847, is designed to obviate certain defects in that coupling which have prevented its successful operation. One of these defects consists in the working parts being so arranged that the box is of necessity firmly and immovably attached to the car. Another defect of considerable importance lies in the indefinite description of the scroll tumbler, by which its construction is left to chance. The first defect I have obviated by so constructing the dog and disengaging guards that the box may be free to move in direction of the length of the car; thus admitting of the attachment of the box to the usual spring bumper of cars. The second defect I overcome by reducing the construction of the tumbler to a given rule.

By the first part of my invention I dispense with the projecting dog tail from the side of the box; substituting for that arrangement a straight bar running to the front of the box, and connecting with this bar in a manner not to interfere with the hanging of the box, a double branched sliding guard for releasing the tumbler either by hand or by the self action of the cars; said guard by reason of its slide being out of the way when the car is not in use. The details of construction and operation will readily be understood from the following description and reference to the drawing.

The general description of the devices for coupling with tumbler, roller and bar head, being fully set forth in Bussey's patent, need not be dwelt upon here except so far as required to illustrate my improvement, the principal parts being the same in both cases.

In the drawing A is the box particularly described in the above mentioned patent, B the tumbler movable about pin or bolt $a$, and C the roller movable on pin or bolt $c'$. The scroll tumbler is held back by dog-bar D movable about pin $d$, and pressed against the scroll tumbler by spring E. On the rear portion of the box is a projection F, by which the box may be bolted to a draw bar of ordinary construction, the front of the box being held up by a strap passing under it, leaving it free to be acted upon by the bumper springs.

From the end of the dog bar D runs the guard bar $f$ at right angles to the dog bar, and then turned so as to run back parallel or nearly so to the side of the box. On this bar is movable the slide $e$, secured to the bar $f'$, so that said bar may assume either of the positions shown in Figs. 1 and 2. The guard bar $f$ by having a cord attached leading to the platform of the car, and so arranged by passing over pulleys as to draw the bar toward the side of the box, serves as a means of uncoupling at the will of the brakeman or conductor, while the guard $f'$ when in the position shown by Fig. 2, will be carried from the box by the running off of the car, and will consequently draw the dog bar D from the notch in the tumbler.

The connecting bar P is of the form shown in the drawing, having a hole in each head, so that a car with this coupling attached may be connected with a car of ordinary construction: this hole moreover serves as a means of spreading the head when from wear it may become too small.

The construction of the scroll is as follows: Across the line $x$ $x$, which I term the base line, draw a line $y$ $y$, making an angle of 20° with the base line. From the intersection $z$ lay off a distance $z$ $z'$ on line $y$ $y$, depending on required size of tumbler; then on $z$ $z'$ describe square $z'$ $z'''$. From $z'$ as a center, with radius $z$ $z'$, describe the arc $z$ $u'$ $u$. Then from $z''$ as a center, with radius $z''$ $v$ describe arc $u$ $v$ $v'$, the termination $v'$ being where said arc cuts the prolongation of $z'$ $z'''$. Join $z$ and $v'$, which gives direction of notch $v'$ $t$, the point $t$ being chosen so as to give any desired depth of notch. From $z$ with a radius $z\ t$ describe the arc $t\ t'$, limited by line $x\ x$. From $z$ lay off on $y\ y$ the distance $z\ r$ three-fourths of $z\ z'$, and with $r$ as a center and radius $r\ z$ draw arc $z\ r'\ r''$ terminating on line $x\ x$. From $z'''$ on line $z'\ v'$ lay off $z'''\ w$ equal to half the diameter of bolt $a$ which will give radius of bolt hole. From $t\ r''$ draw perpendiculars to $x\ x$, and at $w'$ midway between $t$ and $r''$ draw perpendicular $w'\ w''$; then from $w$ with a radius the distance apart of the axes of pins $a$ and $c'$ cut line $w'\ w''$ at $q''$, from which with radius of roller C draw arc $q\ q'''\ q'$, which finishes the tumbler. This construction while it gives the requisite strength brings the draft upon such point of the eccentric tumbler, that the slightest motion of the dog bar, will cause the tumbler to turn into the position shown in Fig. 2 and release the bar P, be the strain on the bar what it may.

The coupling is effected as described in Bussey's patent; the bar head pushing back the tumbler until it is caught by the dog bar D, when the several parts have the relative positions shown in Fig. 1. When two cars are coupled, the guards $f\ f'$ of the respective boxes A will be on opposite sides, and when in position of Fig. 2, the bars $f'$ will project sufficiently for each to run under the platform of the other car, so that on the deviation of a car from the track, one of said bars will be drawn outward by a pin beneath the platform, and the tumbler of one of the couplings released from the dog bar.

Disclaiming the coupling and uncoupling of cars by eccentric tumbler, revolving roller, turning dog and coupling bar as secured by the patent granted to W. C. Bussey, 17th July, 1847, I claim as new and desire to secure by Letters Patent—

The method herein described of releasing the tumbler by double branched sliding guards $f\ f'$ combined with the dog-bar D; whereby the rigid attachment of the box is avoided, and the same rendered capable of attachment to the ordinary spring bumpers as herein set forth.

In testimony whereof I have hereunto set my hand.

A. G. HECKROTTE.

Witnesses:
 GEO. PATTEN,
 JAS. D. CLARY.